A. T. CRAWFORD.
LET DOWN SEAT BACK.
APPLICATION FILED SEPT. 18, 1915.
1,220,498.
Patented Mar. 27, 1917.
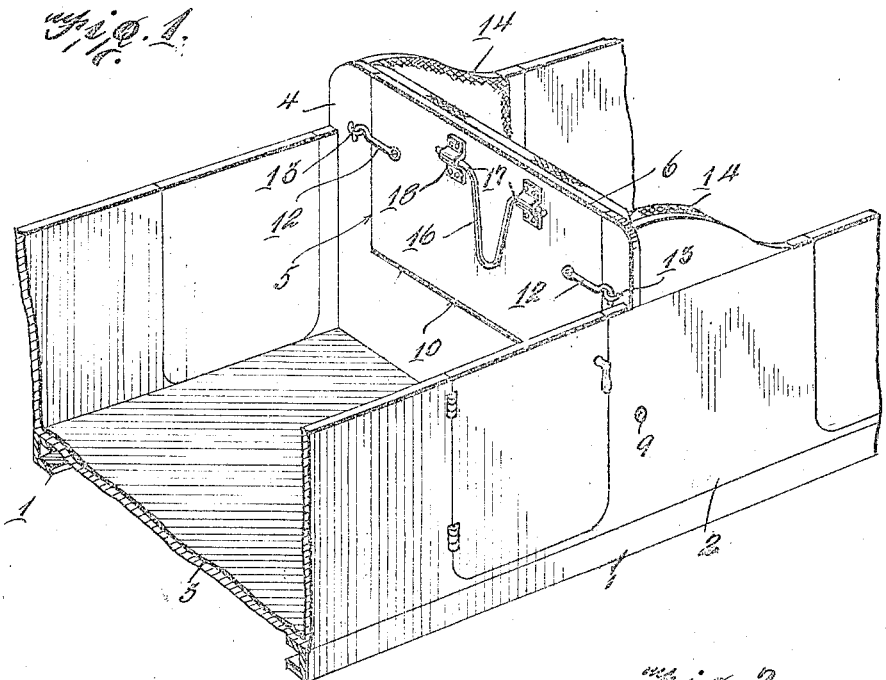
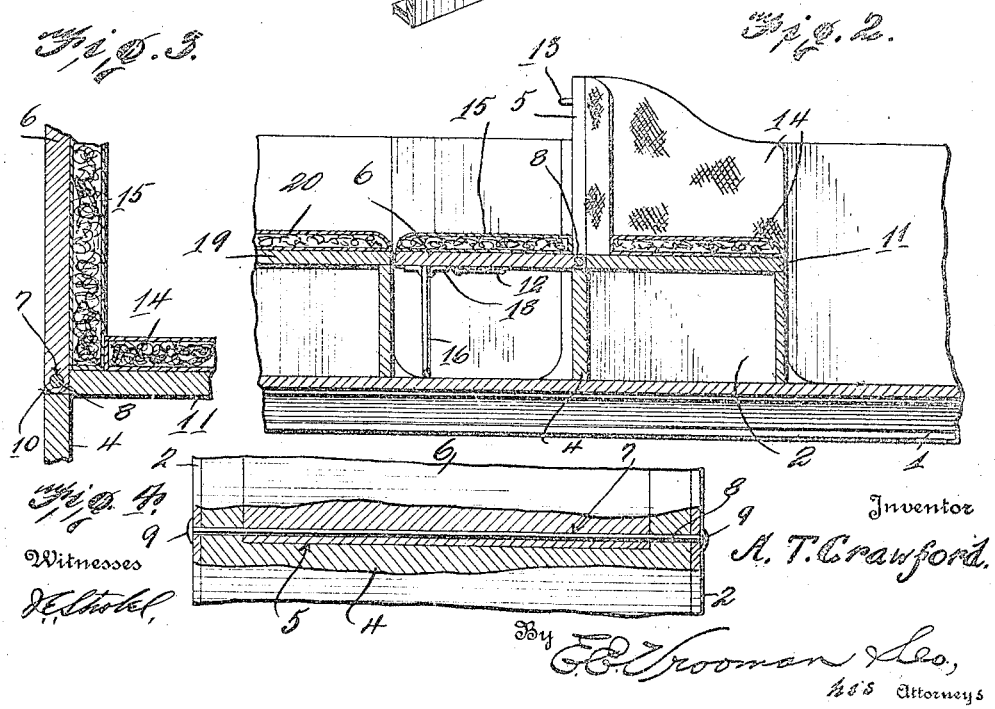

UNITED STATES PATENT OFFICE.

ALDYN T. CRAWFORD, OF CARMEN, OKLAHOMA.

LET-DOWN SEAT-BACK.

1,220,498.  Specification of Letters Patent.  Patented Mar. 27, 1917.

Application filed September 18, 1915. Serial No. 51,449.

*To all whom it may concern:*

Be it known that I, ALDYN T. CRAWFORD, a citizen of the United States of America, residing at Carmen, in the county of Alfalfa and State of Oklahoma, have invented certain new and useful Improvements in Let-Down Seat-Backs, of which the following is a specification, reference being had therein to the accompanying drawing.

This invention relates to let down seat backs or two sectional seats for automobiles, wherein the movable section of the seat may be lowered so as to form a substantially even structure constituting a Pullman or bed portion.

Another object of this invention is the production of a seat for an automobile which may be retained in its vertical position for forming a back-rest but which may be quickly and easily released so as to swing to a horizontal plane to form a conjunction between the front and rear seats, thereby making the bed portion or Pullman.

With these and other objects in view this invention consists of certain novel combinations, constructions, and arrangements of parts as will be hereinafter fully described and claimed.

In the accompanying drawing:—

Figure 1 is a fragmentary detail perspective view of a portion of an automobile body illustrating the sectional portion of the seat in its vertical position.

Fig. 2 is a fragmentary longitudinal section through an automobile body showing the section of the seat swung to a vertical position and extending in a horizontal plane so as to form a bed or Pullman portion.

Fig. 3 is an enlarged fragmentary sectional view through a portion of the front seat illustrating the manner in which the section is pivotally secured.

Fig. 4 is an enlarged fragmentary sectional view through a portion of the automobile showing particularly the manner in which the rod extends through the section of the seat for pivotally supporting the same and also constituting a brace for the side portions of the automobile body.

Referring to the accompanying drawing by numerals it will be seen that the automobile has the usual beams or side rails 1, upon which the sides 2 and bottom 3 are supported. A partition 4 is carried between the sides 2 and above the beam 1 and constitutes a portion of the front seat as shown clearly in Fig. 1. This partition 4 is provided with a rectangular open portion 5 in which the movable section 6 is adapted to normally fit. This section 6 is provided with a longitudinal opening 7 adjacent its lower portion through which passes the rod 8 having the heads 9. This rod also passes through the partition 4 and the sides 2 so as to allow the heads 9 of the rod to engage the outer side surfaces of the sides 2. In this manner it will be seen that the sides 2 will be firmly retained in their correct position upon the end portions of the partition 4 and will be prevented from spreading under any circumstances whatever. The lower side edge of the section 6 is beveled as indicated at 10 so as to allow the section 6 to swing freely when desired without interference from the partition 4 or the base 11 of the front seat. In order to normally retain this section 6 in its vertical position as shown in Fig. 1 there are provided a pair of pivotally secured hooks 12 which are adapted to detachably or releasably engage the eyes 13 mounted upon the rear portions of the partition 4. It is, of course, obvious that the cushions 14 are mounted upon the base 11, and also upon the inner portions of the sides 2, while the cushion 15 is carried in any suitable manner upon the forward surface of the section 6, therefore, when the section 6 is retained in a vertical position as shown in Fig. 1, the cushion 15 thereof will form a back-rest for the front seat. When it is desired to allow the section 6 to be swung downwardly to constitute a bed portion in conjunction with the front and rear seats, the hooks 12 are moved so as to be released from their engagement with the eyes 13. Then by swinging the section 6 rearwardly it will also be swung downwardly, whereby the leg 16 will assume a substantially vertical position. This leg is preferably formed from a strand of wire bent intermediate its ends and terminating in the arms 17 carried by the brackets 18 upon the rear surface of the section 6. When this leg 16 engages the floor 3 of the body, as shown in Fig. 2, it will be seen that the downward movement of the section 6 will be limited. At this time the section 6 will extend in the same plane as the base 11 of the front seat and the bottom 19 of the rear seat, thereby causing the cushions 14, 15 and 20 to extend in alinement with each other, thereby constituting a bed portion or Pullman.

It will be noted by referring particularly to Figs. 2 and 3 that the section 6 is pivotally secured at a point below the upper surface of the base 11 of the front seat and, therefore, when this section 6 is swung downwardly, it will be in alinement with the base and thus eliminate uneven surfaces. It is, of course, obvious that this movable section will not in any way interfere with the operation of the car, but will provide a simple and efficient means for converting an ordinary touring car into a Pullman car, so that whenever desired a bed may be quickly constituted by the releasing of the section and moving the same to a horizontal plane.

Having thus described the invention what is claimed as new is:—

In a let down seat back of the class described, the combination of an automobile body having forward and rear seats, said forward seat having an opening in the back thereof, a section pivotally mounted within said opening, means for releasably holding said section in a vertical position, brackets carried in spaced relation upon the rear surface of said section, a one-piece leg formed from a single strand of wire comprising a substantially U-shaped body having oppositely extending arms extending therefrom, said arms fitting within said brackets, whereby said leg will hang in a vertical plane, whereby as the section is swung to a horizontal plane said leg will depend so as to engage the automobile and support said section.

In testimony whereof I hereunto affix my signature in presence of two witnesses.

ALDYN T. CRAWFORD.

Witnesses:
 ED. APPLEGATE,
 GUY E. SELFRIDGE.